Aug. 12, 1941.  A. W. GELPCKE  2,252,316
SCREW ANCHOR
Filed April 19, 1940
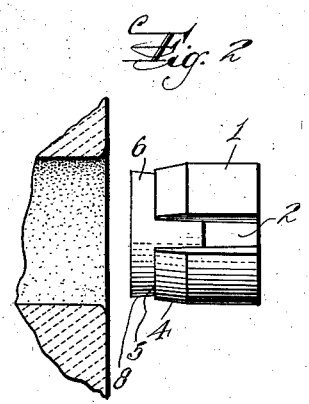
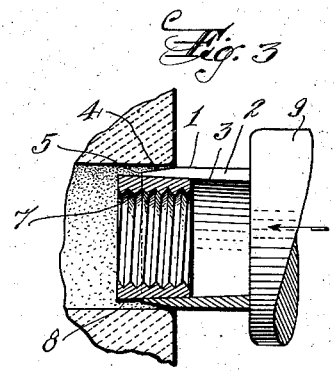
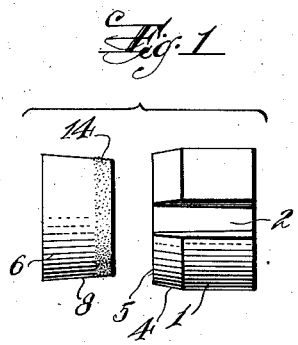
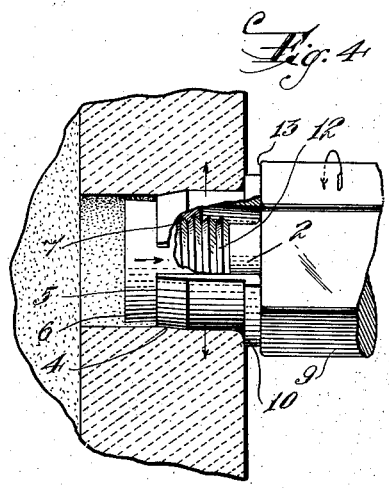
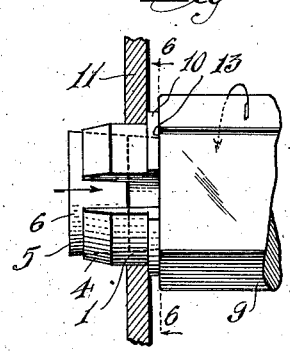
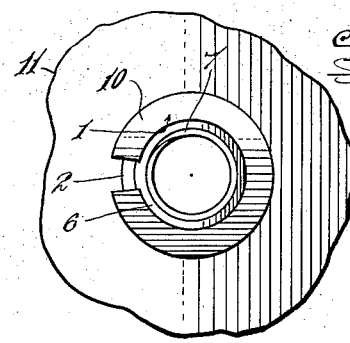
INVENTOR
Alfred W. Gelpcke
BY
A. D. T. Libby
ATTORNEY Patented Aug. 12, 1941

2,252,316

UNITED STATES PATENT OFFICE 2,252,316

SCREW ANCHOR

Alfred W. Gelpcke, Brooklyn, N. Y., assignor to American Bolt Anchor Company, East Syracuse, N. Y.

Application April 19, 1940, Serial No. 330,501

7 Claims. (Cl. 85—2.4)

This invention relates to improvements in screw and bolt anchors and is an improvement on Mirzan Patent No. 1,755,264 issued April 22, 1930.

I have found from many tests of the Mirzan structure that in certain kinds of material, if the sleeve of the anchor is made of steel, there is, after expansion has been made in the hole, some tendency of the sleeve to slip. To overcome this, I have discovered after many tests under the same conditions, that if the sleeve of the anchor is made of a different material such as "Zamak," which is an alloy of zinc and aluminum, this difficulty can be overcome and any tendency for the anchor to "creep" after it has been in use for a long period of time is likewise overcome. This is a case where a change in material produces a decided improvement in the holding power of the anchor.

I have further discovered that by the use of this new material, I can utilize the Mirzan principles for screw or bolt anchors in bottomless holes such as are often encountered in tile or metal parts so thin as to have insufficient threads for a screw to hold an object required to be fastened thereto. By using a nut or threaded member with my improved form of anchor, sufficient threads are obtainable to give the necessary holding force with the screw.

I have found the underlying principles of the Mirzan device to be sound and much superior to all other types of so-called radial expansion anchors having tapered inside sleeves engaged by a conical nut. These devices are really only wedge type of anchors and require considerable depth of hole and secure their locking only over a small area and not throughout the length of the sleeve.

It is therefore the principal object of my invention to provide an improved type of screw anchor which will be satisfactory for use throughout a wide range of application and one which can be used in a hole with a bottom or in a bottomless hole.

My invention will be readily understood from the following specification taken in connection with the annexed drawing wherein—

Figure 1 is a view showing the two parts of my improved type of screw anchor in disassembled relation.

Figure 2 is a view of the parts assembled as a unit ready for installation in a hole in masonry or tile.

Figure 3 is a view similar to Figure 2 showing the first step in the installation of the anchor unit.

Figure 4 is a view showing the anchor forced into position in a hole, the anchor being a slightly modified form of that shown in Figures 2 and 3 to the extent that it has an outer retaining flange.

Figure 5 is a view of the device shown in Figure 4 but applied to a thin metal strip.

Figure 6 is a view on the line 6—6 of Figure 5, with the assembly tool removed.

In the different views, 1 is a sleeve of some hard metal, preferably composed of an alloy of zinc and aluminum known in the trade as "Zamak." The sleeve 1 has a split 2 longitudinally of its length, which construction will produce as uniform a fit in the hole as it is practically possible to obtain.

The interior wall 3 of the sleeve 1 is provided with a slight taper longitudinally of its entire length. Also, its exterior surface at the hole entering end is provided with a sharper taper 4 extending approximately from one-eighth to one-quarter of the length of the sleeve, thereby forming at the hole entering end of the sleeve 1, a relatively thin edge 5, the purpose of which will be presently pointed out.

An expanding member 6 has an interior thread 7 to receive a screw or bolt. Its outer peripheral surface 8 is slightly tapered to cooperate with the taper 3 on the sleeve 1. Preferably these tapers are within the range of from three to six degrees and I prefer to make the taper 8 on the member 6 slightly greater than the internal taper of the sleeve 1, although this is not absolutely necessary in all cases.

In any event, the sleeve 1 and the nut or expanding member 6 can be assembled and shipped as a unit as shown in Figure 2. A slight tap or pressure on the member 6 will force it into locking engagement with the sleeve 1. I have found that in making the thin edge 5 on the sleeve 1, this locking feature is enhanced and is highly advantageous in the installation of the device in a bottomless hole such as is encountered in using the anchor in thin metal or in tile. The taper 4 also materially assists in inserting the anchor in the hole, especially one that has a sharp or unbroken edge.

It is to be noted that the largest diameter of the member 6 is less than the diameter of the sleeve 1, so that as the sleeve is forced or wedged into position in the hole, as shown in Figure 3, the outer wall of the sleeve is the part that encounters the wall of the hole, producing a uniform gripping on the nut as well as on the wall of the hole. After the unit has been installed in the hole by use of a tool, such as 9, an object to be held in place is then applied and the pulling up of the screw will draw the member 6 further into the sleeve 1, expanding it uniformly into circumferential engagement with the hole along the length of the sleeve from the external taper.

Where the unit is to be used in material having a bottomless hole, the sleeve 1 may be provided with a flange 10 which is larger than the hole so that the anchor unit may not be driven accidentally through the hole or too far into the hole. This flange type of anchor is especially useful when using the anchor in thin metal 11 as illustrated in Figure 5. I have made very satisfactory tests using this small screw anchor in aluminum sheets of one-eighth of an inch in thickness or less, the holding power being substantially greater than can be obtained by standard screw threads in the aluminum sheet.

As shown in Figure 5, the hole in the metal strip or plate can be accurately made by use of a twist drill or punch and I have found that with my improved type of anchor, it will lock tightly in the metal plate 11 even without driving it into place by any tool. As a matter of fact, I may use a sleeve on the anchor such as shown in Figure 1, without any flange whatever by assembling the anchor on a tool such as indicated in Figure 4, in which the threaded end 12 of the tool is passed through the sleeve 1 into threaded engagement with the member 6, after which the unit may be pushed into place in the hole in the metal strip 11.

Due to the locking characteristics between the sleeve 1 and the member 6, a few turns on the tool will draw the member 6 into the sleeve sufficiently to expand it into tight engagement with the plate 11. The shoulder 13 on the tool 9 will prevent the sleeve 1 from moving out of position during the initial setting of the member 6. This provides a very speedy installation of the screw anchor and an arrangement which will give threads enough to provide the necessary holding power for the screw.

In some extreme cases, the outer surface of the expanding member 6 may be slightly roughened on its entering end as indicated at 14, or the whole outer surface of the nut may be treated with ferric-chloride in water in the presence of mercuric-chloride to give an etched effect.

From what has been said, it will be obvious to one skilled in the art that the screw anchor heretofore described can be used in places where no other type of anchor can be utilized.

What I claim is:

1. As an article of commerce, a screw anchor comprising a sleeve of tough resilient material made of an alloy of zinc and aluminum and split longitudinally of its length and having a small internal taper from end to end, and a portion of the exterior surface tapered in reverse direction to the inner taper, a cone shaped threaded member having its taper closely approaching the inner taper of the sleeve and fitting within the double tapered end of the sleeve so one end is exposed beyond this end, the diameter of this exposed end of said member being smaller than the external diameter of the sleeve.

2. A screw anchor for a bottomless hole comprising a unit composed of a sleeve of strong resilient material made of an alloy of zinc and aluminum and split from end to end and formed with a small internal taper extending from end to end in greater diameter toward the hole entering end of the sleeve, the sleeve also having an external taper at the hole entering end in reverse direction to the internal taper and extending only a small part of its length, and a slightly tapered cone shaped internally threaded member fitting within the hole entering end of the sleeve but protruding therefrom, the protruding end being smaller in diameter than the outer diameter of the sleeve so the unit may be readily inserted into a bottomless hole.

3. A screw anchor for use in a hole in thin material as defined in claim 2, further characterized in that the drive end of the sleeve has an annular flange to prevent the anchor from being passed clear through the hole.

4. A screw anchor for use in a hole in thin material as defined in claim 2, further characterized in that the drive end of the sleeve has an annular flange to prevent the anchor from being passed clear through the hole, and further characterized in that the external taper at the hole entering end of the sleeve is such as to form with the inner taper, a relatively thin edge which grips the threaded member as and for the purpose described.

5. A screw anchor unit especially adapted for use in a bottomless hole comprising a sleeve of tough resilient material split longitudinally of its length and having a short exterior taper at its hole-entering end and also having a small internal taper longitudinally of its length, with the large end of the taper being at the hole entering end of the sleeve and an internally threaded member having an external taper to cooperate with the internal taper on the sleeve, and means on the threaded member for assisting in holding the sleeve and threaded member in assembled position prior to and during installation in a hole.

6. Means for attaching a part to a relatively thin member by means of screws, said means including a unit type screw anchor having a sleeve of outer uniform diameter over the greater part of its length for engaging the wall of a hole in said member and an expanding member having one end fitting within the sleeve, the sleeve having a small internal taper extending throughout its length and being split throughout its length and furthermore having a short external taper at its hole entering end, the expanding member being internally threaded and having a small taper to cooperate with the taper in the sleeve to expand the same, the unit being installed in the hole by a tool having a threaded end to engage the threaded expanding member and a shoulder to engage the outer end of the sleeve to hold the sleeve in place in the hole when the tool is turned to draw the expanding member into sleeve locking position in the hole.

7. A screw anchor unit which can be used in a hole that has been drilled to a greater depth than the initial length of the anchor unit, and wherein the unit may be positioned in the hole at any desired depth therein, said unit comprising a sleeve of tough, resilient material split from end to end and formed with a small internal taper extending substantially from end to end, the large end of the taper being toward the hole entering end of the sleeve, the sleeve also having a short external taper at its hole entering end, and an expanding member having an external taper to cooperate with the internal taper on the sleeve, the expanding member being internally threaded to receive a tool having a threaded end and a positioning shoulder whereby the unit may be attached to the tool and then positioned in the hole at any desired depth before turning the tool to draw the expanding member into sleeve locking position in the hole.

ALFRED W. GELPCKE.